United States Patent [19]

Petersen et al.

[11] Patent Number: 4,621,133

[45] Date of Patent: Nov. 4, 1986

[54] PREPARATION OF CURABLE ETHERIFIED AMINOPLAST RESINS AND OF SURFACE COATING RESINS

[75] Inventors: Harro Petersen, Frankenthal; Günther Immel, Weinheim; Wolfram Weiss, Mutterstadt; Horst Schmidt, Mannheim; Gerd Busse, Mutterstadt, all of Fed. Rep. of Germany

[73] Assignee: BASF Aktiengesellschaft, Ludwigshafen, Fed. Rep. of Germany

[21] Appl. No.: 752,067

[22] Filed: Jul. 5, 1985

[30] Foreign Application Priority Data

Jul. 7, 1984 [DE] Fed. Rep. of Germany ....... 3425131

[51] Int. Cl.$^4$ ............................................ C08G 12/28
[52] U.S. Cl. .................... 528/252; 525/509; 525/515; 528/259; 528/261; 528/266
[58] Field of Search ............... 528/232, 252, 259, 261, 528/266; 525/509, 515

[56] References Cited

U.S. PATENT DOCUMENTS 4,102,840  7/1978  Pusch ............................. 528/259 X
4,298,512 11/1981  Sartoretto ....................... 528/259 X

*Primary Examiner*—Lucille M. Phynes
*Attorney, Agent, or Firm*—Keil & Weinkauf

[57] ABSTRACT

A process for the preparation of curable etherified aminoplast resins based on urea/aldehyde polycondensates, and the preparation of surface coating resins.

Urea is first reacted with an $\alpha,\alpha$-dialkylaldehyde, as much as 50 mol % of which may be replaced by formaldehyde, in a molar ratio urea/aldehyde of about 1:2, at from 50° to 120° C., in the presence of an acid and in the presence or absence of an alcohol or of other organic solvents, and the 2-oxohexahydropyrimidine derivative obtained in this cyclocondensation is then condensed with formaldehyde in the presence of one or more alcohols and an acid.

These aminoplast resins are useful as both acid-curable resins and as resins for baking finishes.

7 Claims, 1 Drawing Figure

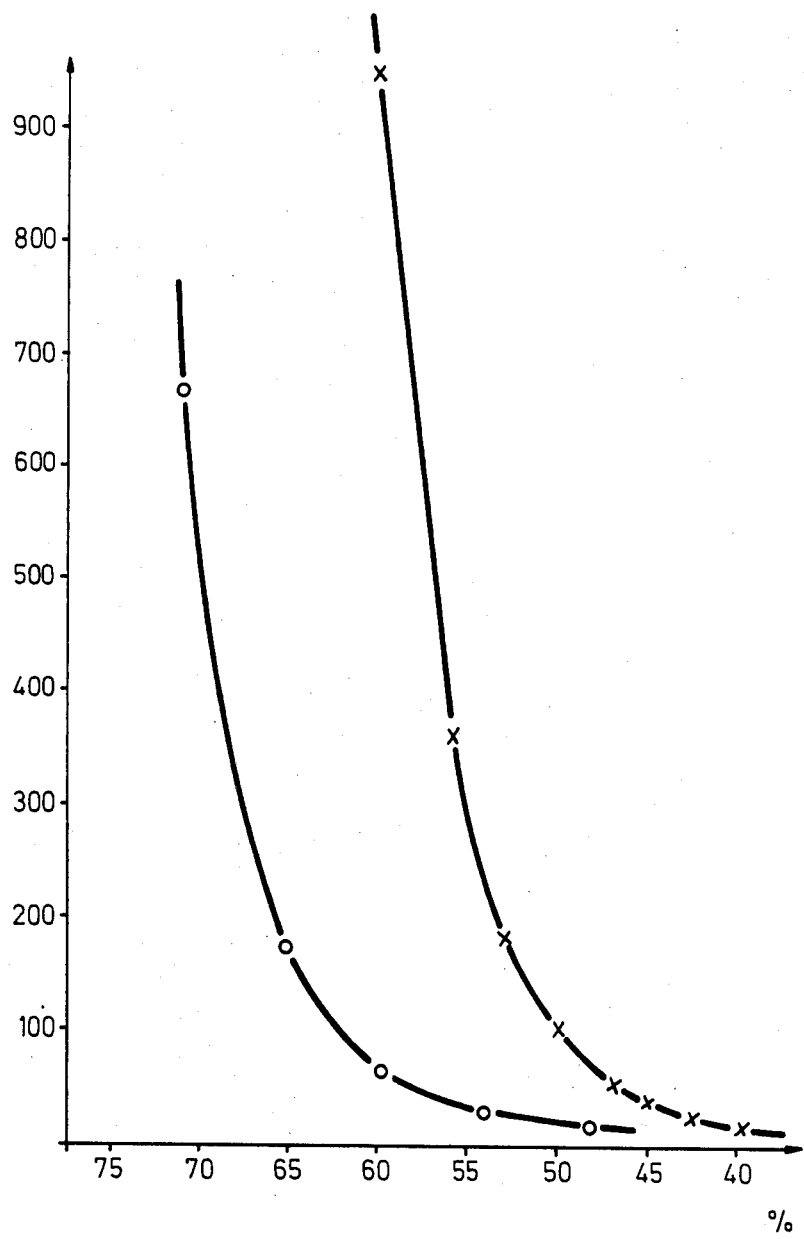

PREPARATION OF CURABLE ETHERIFIED AMINOPLAST RESINS AND OF SURFACE COATING RESINS

The present invention relates to a process for the preparation of curable etherified aminoplast resins based on urea/aldehyde polycondensates and to the preparation of surface coating resins.

Etherified aminoplast resins are raw materials which are useful as curable components in acid-curable or heat-curable surface coatings and, in some cases, as elastifying resins. They are generally combined with alkyd resins. These mixtures can be cured either by the action of heat (baking finishes) or by the addition of acids (acid-curable surface coatings) at room temperature or elevated temperature.

The conventional etherified urea surface coating resins are based on condensates of urea with formaldehyde and alcohols or aminotriazines, for example melamine, formaldehyde and alcohols. For the processing of etherified aminoplast surface coating resins, products which cause little pollution, i.e. resins having a low solvent and formaldehyde content, are required. Pure urea resins, melamine resins and mixed resins meet this requirement only to a limited extent.

It is an object of the present invention to provide a process for the preparation of reactive etherified aminoplast resins which permits cheap starting materials to be used in a simple manner to produce reactive etherified surface coating resins which, as high-solid resins, are compatible with the conventional solvents and additives and eliminate only a small amount of formaldehyde during acid curing or when used as a baking finish.

We have found that this object is achieved by a process for the preparation of curable etherified aminoplast resins based on urea/aldehyde polycondensates, wherein urea is first reacted with an α,α-dialkylaldehyde of the general formula

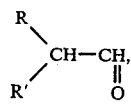

where R and R' are identical or different and are each alkyl of 1 to 6 carbon atoms, in a molar ratio (urea/aldehyde) of about 1:2, where as much as 50 mol % of the α,α-dialkylaldehyde may be replaced with formaldehyde, at from 50° to 120° C., under atmospheric or superatmospheric pressure, in the presence of an acid and in the presence or absence of one or more alcohols and/or other organic solvents, and the 2-oxohexahydropyrimidine derivative obtained in this cyclocondensation is then condensed with formaldehyde in the presence of one or more alcohols and of an acid and in the presence or absence of an inert diluent, advantageously at 50°–120° C.

The cyclocondensation product can first be hydroxymethylated and then be condensed with an alcohol in an acidic medium, or the hydroxymethylation and condensation of the 2-oxohexahydropyrimidine derivative can be carried out simultaneously at a pH of from 3 to 6. For example, cyclocondensation can be effected in the first stage by reacting 1 mole of urea with 2 moles of isobutyraldehyde to give 4-hydroxy-5,5-dimethyl-6-isopropylpropyleneurea or, in the presence of an alcohol, to give a 4-alkoxy-5,5-dimethyl-6-isopropylpropyleneurea.

The present invention furthermore relates to a process for the preparation of acid-curable surface coating resins and resins for baking finishes, wherein the aminoplast resins prepared according to the invention are combined with conventional surface coating binders.

Regarding the novel process and the starting materials which are suitable for it, the following may be stated specifically:

The preparation of the propyleneureas is described in the literature and in patents, for example by H. Petersen, Angew. Chem. 76 (1964), 909, and G. Zigeuner and W. Rauter, Mh. f. chem. 96 (1965), 1950, and in German Pat. Nos. 1,230,805, 1,545,610, 1,670,085, 1,670,087, 1,670,089, 1,670,093, 1,670,094, 1,670,129, 1,670,130, 1,231,247 and 1,545,601.

The reaction of such 4-hydroxy(alkoxy)-propyleneureas (2-oxohexahydropyrimidine derivatives) with formaldehyde and alcohols to give surface coating resins can be carried out by different procedures. For example, the propyleneurea can first be hydroxymethylated with formaldehyde in the presence of a basic catalyst and the product then alkoxymethylated with an alcohol in the presence of an acidic catalyst and finally condensed to give the surface coating resin. In a particularly elegant procedure, the hydroxymethylation and alkoxymethylation and the condensation to give the surface coating resin can be carried out in one stage. In this procedure, the propyleneurea produced in the first stage is reacted with formaldehyde in a molar ratio of from 1:1 to 1:2, preferably from 1:1.6 to 1:2.0, in the presence of not less than 2 moles of an alcohol at a pH of 3.5–6 at 50°–120° C. to give the surface coating resin. The resulting water of reaction is advantageously removed by distillation, together with the water introduced by the use of aqueous formaldehyde.

In a particularly preferred process for the preparation of a high-solid surface coating resin, urea is reacted, in the first stage, with aqueous formaldehyde, isobutyraldehyde and, for example, isobutanol in a molar ratio of 1:1:1:4 in a solution containing sulfuric acid to give a reaction mixture consisting of 4-hydroxy- and 4-isobutoxy-5,5-dimethylpropyleneurea, and the reaction mixture obtained is then brought to pH 3.5–4 with sodium hydroxide solution and the aqueous phase is separated off. The weakly acidic organic phase is finally converted to the surface coating resin by adding 1.5–2 moles of formaldehyde, water being distilled off azeotropically in the final phase.

Urea can be used in solid or aqueous form or in solution in an organic solvent. Advantageous solvents are the alcohols used for the etherification.

Formaldehyde can be employed in aqueous form, as paraformaldehyde or in the form of the hemiacetals. Adducts and precondensates of urea with formaldehyde, e.g. ®Formol, are also suitable.

According to the invention, suitable α,α-dialkylaldehydes of the general formula

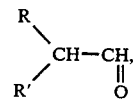

where R and R' are identical or different and are each alkyl of 1 to 6, preferably 1 to 4, carbon atoms, are all those CH-acidic aldehydes which still have a mobile hydrogen atom in the α-position. Examples of preferred CH-acidic aldehydes are isobutyraldehyde, α-methylbutyraldehyde, α-ethyl-butyraldehyde and α-ethylhexanal. Instead of the aldehydes, it is also possible to use substances which react in the same way as aldehydes under the reaction conditions, for example the hemiacetals or full acetals of the aldehydes.

Preferred alcohols for the preparation of the surface coating resins are monohydric alcohols, e.g. methanol, ethanol, n- and isopropanol and n- and isobutanol, and mixtures of these. High molecular weight monohydric and polyhydric alcohols can be used as elastifiers and modifiers.

Suitable acids or acidic substances are conventional hydrogen ion donors, e.g. hydrochloric acid, sulfuric acid, nitric acid, oxalic acid and p-toluenesulfonic acid. Advantageously, the acid for the cyclocondensation is added in an amount sufficient to bring the reaction mixture to a pH of from about 0 to 3.

It is advantageous to carry out the cyclocondensation in the presence of an inert solvent and/or alcohol which is sparingly soluble in water, so that the aqueous phase can subsequently readily be separated off from the organic phase.

The hydroxymethylation of the propyleneurea produced in the first stage can also be effected in the presence of a base, e.g. sodium hydroxide solution, potassium hydroxide solution or sodium carbonate, but is preferably carried out together with the etherification at a weakly acidic pH. Combined hydroxymethylation and alkoxymethylation, and the resulting condensation to the reactive surface coating resin, constitute an embodiment which is particularly time-saving and hence economical. In many cases, residual neutralization is unnecessary.

The condensation is advantageously carried out so that the residual content of free methylol groups is less than 10%, preferably 3–6%, based on the 100% strength resin. The content of free formaldehyde should be less than 0.5%, preferably from 0 to 0.2%. The condensation is preferably carried out in such a way that a 90% strength solution of the resin in isobutanol has a viscosity of less than 10 Pa.s at room temperature.

The surface coating resins prepared by the novel process can be concentrated to any desired solids content. The conventional surface coating solvents can be used to dilute them for use.

The surface coating resins prepared by the process according to the invention are very compatible with the conventional surface coating binders, for example alkyd resins, nitrocellulose, ketone resins and aldehyde resins, elastifiers, for example conventional plasticizers, cellulose acetobutyrate, polyvinylbutyral, vinyl acetate/vinyl chloride copolymers and oil-modified alkyd resins, conventional inorganic and organic pigments and dyes, and other assistants conventionally employed in surface coating technology, e.g. leveling agents and curing agents, such as toluenesulfonic acid, hydrochloric acid, phosphoric acid and butylphosphoric acid.

Particularly noteworthy is the extremely low content of free formaldehyde in the surface coating resins prepared according to the invention, and the high stability to hydrolysis, the consequence of this stability being the elimination of an extremely small amount of formaldehyde during acid curing or baking.

The surface coating resins prepared according to the invention can be used, in combination with conventional additives mentioned above, as surface coating binders for the production of coatings on all possible substrates, e.g. metal, wood, paper and glass. They are suitable as both heat-curable (baking finishes) and acid-curable surface coating binders. When the resins are used in baking finishes, the high solids content in the form as delivered, the more advantageous dilution curve and, consequently, the higher solids content at spray viscosity are noteworthy in comparison with conventional urea/formaldehyde resins.

In the development of surface coating systems which cause little pollution, a very high solids content and therefore a very low solvent content are desirable in the field of baking finishes. The advantage of the novel resins in this respect is illustrated in Examples 4 to 8.

In the Examples, parts and percentages are by weight.

EXAMPLE 1

In a stirred apparatus provided with an efficient reflux condenser, 3.3 parts of 75% strength sulfuric acid are added to a mixture of 45 parts of urea, 56.25 parts of 40% strength aqueous formaldehyde, 54 parts of isobutyraldehyde and 222 parts of isobutanol at room temperature, the reaction mixture warming up to 50°–55° C. during this procedure. The stirred mixture is refluxed for 5 hours, the temperature increasing to 95° C. When the mixture has been cooled to 50° C., the pH is brought to 5–6 with about 3 parts of 50% strength sodium hydroxide solution, and the aqueous phase is separated off. 91.1 parts of 40% strength aqueous formaldehyde solution are added to the isobutanol phase and water is separated off at 90°–100° C. in the course of about 4 hours, after which the mixture is neutralized with 50% strength sodium hydroxide solution, and excess isobutanol is distilled off under reduced pressure. After the addition of 20 parts of xylene, 220 parts of an approximately 90% strength reactive surface coating resin are obtained. The content of free formaldehyde is 0.1%.

EXAMPLE 2

540 parts of urea, 2,664 parts of isobutanol, 675 parts of 40% strength aqueous formaldehyde and 648 parts of isobutyraldehyde are introduced into a stirred kettle, the kettle is closed, and 65 parts of 50% strength sulfuric acid are metered into the stirred mixture. The reaction is slightly exothermic, and the pressure in the closed stirred kettle increases to 1.3 bar. The mixture is stirred for 1 hour at 90° C. and then cooled to 50° C., and the pH is brought to 5 with 25% strength sodium hydroxide solution. The stirrer is switched off and, after 30 minutes, the aqueous phase (360 parts) is separated off via a separating vessel. 1,094 parts of 40% strength aqueous formaldehyde and 380 parts of isobutanol are introduced into the stirred organic phase, and water is separated off under reflux at a pH of 5. Thereafter, the mixture is neutralized with 25% strength sodium hydroxide solution and the excess isobutanol is distilled off.

To produce a surface coating resin suitable for use, the viscosity is adjusted by adding 380 parts of isobutanol, and 2,347 parts of an 85% strength surface coating resin are obtained. The content of free formaldehyde is only 0.1%. This high-solid surface coating resin has a viscosity of 2,350 mPa.s.

EXAMPLE 3

5 parts of 50% strength sulfuric acid are added to a mixture of 222 parts of isobutanol, 45 parts of urea, 56.25 parts of 40% strength aqueous formaldehyde solution and 54 parts of isobutyraldehyde. The stirred reaction mixture is refluxed for three hours, the temperature increasing to about 95° C. The mixture is cooled to about 50° C. and then neutralized with 50% strength sodium hydroxide solution, and the aqueous phase is separated off. 91.1 parts of 40% strength aqueous formaldehyde solution are added to the isobutanol phase, the pH is brought to 9-9.5 and the mixture is then stirred for 1 hour at 50° C. Thereafter, the pH is brought to 3.8-4.0 with 50% strength sulfuric acid, and water is separated off. The mixture is then cooled and neutralized, and excess isobutanol is distilled off under reduced pressure. 200 parts of a 95-98% strength colorless reactive surface coating resin containing 0.25% of free formaldehyde are obtained.

Testing of the performance characteristics of the aminoplast resins prepared according to the invention.

I. Baking finishes

The commercial comparative resins A, B and C employed were as follows:

A: a moderately reactive urea/formaldehyde resin etherified with isobutanol, in the form of a 60% strength solution in isobutanol, B: a highly reactive urea/formaldehyde resin etherified with isobutanol, in the form of a 60% strength solution in isobutanol, and C: a moderately reactive melamine/formaldehyde resin etherified with isobutanol, in the form of a 55% strength solution in isobutanol.

EXAMPLE 4

The aminoplast resin prepared as described in Example 1 was used as a crosslinking agent in a surface coating suitable for primers and having the following composition:

332 parts of alkyd resin (synthetic fatty acid alkyd resin, 75% in xylene)
77 parts of the aminoplast resin described in Example 1
96 parts of TiO$_2$ ®Kronos RN 57, Titangesellschaft Leverkusen
196 parts of lithopone (pigment filler, Lithoponekontor, Cologne)
1.6 parts of furnace black 101 (black pigment, Degussa, Frankfurt/Main)
96 parts of permanent white (filler based on BaSO$_4$)
34 parts of butanol.

The surface coating was diluted with xylene to a spray viscosity corresponding to an efflux time (DIN cup 4) of 25 seconds, after which it contained 68% of non-volatile constituents (2 hours/125° C., DIN 53,216).

Comparison A

Using a procedure similar to that described in Example 4, the primer was prepared with the comparison resin A and likewise diluted so that its efflux time (DIN cup 4) was 25 seconds. It contained 63% of non-volatile constituents (2 hours/125° C., DIN 53,216).

Based on the volatile constituents, which comprised 32% in Example 3 and 37% in comparison A, 14% of solvent was saved in Example 4.

In the Examples below, the surface coating resin prepared as described in Example 3 was used as a crosslinking agent in baking finishes.

EXAMPLE 5

Glass spheres were added to
187 parts of alkyd resin (synthetic fatty acid alkyd, 75% strength in xylene)
77 parts of the aminoplast resin described in Example 3,
100 parts of TiO$_2$ (Kronos RN 57),
100 parts of an 8:2 xylene/ethylglycol mixture and
5 parts of Byk 300 (leveling agent from Mallinckrodt, Wesel)

and the mixture was milled for 20 minutes on a vibratory mill (Red Devil, manufactured by Red Devil Inc., New Jersey), freed from the glass spheres by sieving, and diluted with an 8:2 xylene/ethylglycol mixture so that its efflux time (DIN cup 4) was 20 seconds. The resulting surface coating contained 54% (2 hours/125° C., DIN 53,216) of non-volatile constituents, and was applied with a spray gun onto 1 mm thick deep-drawn sheets in a layer about 55 μm thick when dry. The coated sheets were dried in the air for 5 minutes and then baked at 120° C. or 150° C. for 30 minutes.

The following surface coating properties were determined:

| | 120° C. | 150° C. |
|---|---|---|
| Baking temperature | | |
| Gloss (according to Gardner, 60°) | 98% | 88% |
| Erichsen deep drawing value (DIN 53,156) | 11.0 mm | 8.7 mm |
| Pendulum damping (DIN 53,157) | 67 sec. | 165 sec. |
| Crosshatch test (DIN 53,151) | 2.5 | 3.5 |
| Short-term weathering (DIN 53,387); (after 250 hours): | | |
| Gloss (according to Gardner, 60°) | 73% | 68% |
| Chalking (DIN 55,223) | 0 | 0 |

Comparison B

Using a procedure similar to that described in Example 5, a top coat was prepared with the comparative resin B and was processed. The following properties were determined:

| | | |
|---|---|---|
| non-volatile constituents (2 hours/125° C., DIN 53,216): | 50% | |
| Baking temperature | 120° C. | 150° C. |
| Gloss | 92% | 87% |
| Erichsen deep drawing value | 10.7 mm | 9.2 mm |
| Pendulum damping | 32 sec. | 91 sec. |
| Crosshatch test | 3 | 3.5 |
| Short-term weathering (after 250 hours): | | |
| Gloss | 72% | 63% |
| Chalking | 0 | 0 |

Comparison C

Using a procedure similar to that described in Example 5, a top coat was prepared with the comparative resin C and was processed and tested.

| | | |
|---|---|---|
| non-volatile constituents (2 hours/125° C., DIN 53,216): | 50% | |
| Baking temperature | 120° C. | 150° C. |
| Gloss | 91% | 87% |
| Erichsen deep drawing value | 9.9 mm | 6.8 mm |
| Pendulum damping | 71 sec. | 102 sec. |

| -continued | | |
|---|---|---|
| Crosshatch test | 3.5 | 4.0 |

EXAMPLE 6

Using a procedure similar to that described in Example 5, a top coat was prepared in which, instead of 187 parts of the 75% strength fatty acid alkyd resin, 233 parts of a 60% strength castor oil alkyd dissolved in xylene were used. The test gave the following results:

| non-volatile constituents (2 hours/125° C., DIN 53,216): | 50% | |
|---|---|---|
| Baking temperature | 120° C. | 150° C. |
| Gloss | 94% | 91% |
| Erichsen deep drawing value | 10.6 mm | 8.4 mm |
| Pendulum damping | 80 sec. | 161 sec. |
| Crosshatch test | 2 | 2.5 |
| Short-term weathering (after 250 hours): | | |
| Gloss | 73% | 59% |
| Chalking | 0 | 0 |

Comparison D

Using a procedure similar to that described in Example 6, a surface coating was prepared with comparative resin B and was tested:

| non-volatile constituents (2 hours/125° C., DIN 53,216): | 45% | |
|---|---|---|
| Baking temperature | 120° C. | 150° C. |
| Gloss | 94% | 90% |
| Erichsen deep drawing value | 9.6 mm | 8.8 mm |
| Pendulum damping | 73 sec. | 122 sec. |
| Crosshatch test | 3.3 | 2.5 |
| Short-term weathering (after 250 hours): | | |
| Gloss | 67% | 53% |
| Chalking | 0 | 0 |

Comparison E

Using a procedure similar to that described in Example 6, a baking finish was prepared with comparative resin C and was tested:

| non-volatile constituents (2 hours/125° C., DIN 53,216): | 45% | |
|---|---|---|
| Baking temperature | 120° C. | 150° C. |
| Gloss | 96% | 94% |
| Erichsen deep drawing value | 8.4 mm | 7.0 mm |
| Pendulum damping | 95 sec. | 127 sec. |
| Crosshatch test | 4 | 3.5 |

Comparison of Examples 5 and 6 with comparisons B and C or D and E shows that the surface coatings have a substantially higher solids content in the processing state when a novel resin is employed. The surface coating properties are not adversely affected; instead, very great hardness is achieved in the case of Examples 5 and 6 at a high baking temperature.

EXAMPLE 7

The high-solid character of the raw materials for the surface coating is represented in practice using the dilution curve.

The aminoplast resin obtained as described in Example 3 was diluted successively with n-butanol. For the individual dilution samples, the efflux time (DIN cup 4) and the content of non-volatile constituents (2 hours/125° C., DIN 53,216) were determined, the viscosity (efflux time, DIN cup 4) being plotted against the solids content (content of non-volatile constituents; 2 hours/125° C., DIN 53,216). The results are shown in the figure in the form of a graph. For comparison, this procedure was also applied to comparative resin B.

II. Acid-curable surface coatings

Acid-curable alkyd/urea resin combinations are used in large amounts for coating wood, for example for furniture, or for sealing parquet floors. Their advantages consist in rapid drying and good mechanical and chemical stability of the applied surface coating films.

An important disadvantage of this class of binders is the odor nuisance to which the processor is exposed owing to the emission of formaldehyde from the wet surface coating film. Formaldehyde is noticeable by its pungent smell even in low concentrations, and is furthermore highly toxic (MAC value 1 ppm).

A number of attempts to overcome this problem are known from the literature.

For example, one attempt at overcoming this problem comprises after-treatment of the urea resins with formaldehyde-reactive chemicals, such as sodium bisulfite, hydrogen peroxide or ammonia (GB-A No. 1,116,087, DE-A No. 1,595,204 and DE-A No. 1,595,206). In another procedure, an attempt is made to reduce the content of free formaldehyde in the urea resins by distillation (DE-A No. 1,595,205 and No. 1,595,224).

However, these measures do not have the desired success in reducing the formaldehyde emission from the surface coating film directly after application. European Pat. No. 43,036 describes the addition of ethyleneurea to the acid-curable surface coating. This measure reduces the emission of formaldehyde by only about 50% and adversely affects the pot life of the acid-curable surface coating.

The advantage of using the novel resins as crosslinking agents in acid-curable surface coatings is demonstrated by the Example below.

EXAMPLE 8

32.5 parts of the aminoplast resin prepared as described in Example 1, in the form of a 74% strength solution in isobutanol, were mixed with 60 parts of an alkyd resin solution (castor oil alkyd, 60% strength in xylene), and the mixture was diluted with 52 parts of a 2:1 ethanol/ethylene glycol mixture to a solids content of 40%. 6 parts of a 30% strength ethanolic solution of p-toluenesulfonic acid were added, after which the surface coating activated in this manner was applied onto glass by means of a 180 μm film casting frame and stored at 23° C. and 50% relative humidity. The König pendulum hardness (DIN 53,157) was determined after 3, 5, 7, 24 and 48 hours. Furthermore, the surface coating itself was observed, and the time taken at 23° C. for gelling to occur was determined as the pot life.

The formaldehyde emission was determined by the following method: the surface coating to be investigated was applied onto a weighed 8×15 cm glass sheet by means of a knife coater, to give a wet film 100 μm thick, and the glass sheet was then immediately placed in a desiccator (nominal diameter 20 cm), and the desiccator was closed and flushed with 1 l/minute of air (23° C., 50% relative humidity). This air was passed through water in a vessel, and washed thoroughly. The vessel was replaced after ½ hour, 1 hour and 4 hours, and the measurement was complete after 24 hours. The amounts of formaldehyde in the vessels were determined photometrically by the acetylacetone method. The remaining amount of surface coating in the 24-hour old dry film served as a reference in each case.

The test results of Example 7 are shown in Table 2.

Comparison F, G and H

40% strength acid-curable surface coatings were prepared by a procedure similar to that described in Example 8, the commercial urea/formaldehyde resins described as low-formaldehyde and listed and characterized in Table 1 being employed. Processing and testing were carried out as described in Example 8.

The surface coating prepared using the novel surface coating resin (Example 8) shows a change in the pendulum hardness similar to that exhibited by the comparative surface coatings, but has a substantially longer pot life (Table 2).

With regard to formaldehyde emission, the value for this surface coating is only 15-25% of the amounts for the comparative surface coatings, although the amounts of free formaldehyde in the urea resins employed were similar.

TABLE 1

Composition of low-formaldehyde urea resins for acid-curable surface coatings

| | Amount of non-volatile constituents (DIN 53,216) 2 hours/125° C. | Alcohol for etherification | Solvent | Free formaldehyde |
|---|---|---|---|---|
| Comparative resin D for comparison F | 71% | iso-butanol | ethanol/butanol | 0.33% |
| Comparative resin E for comparison G | 84% | butanol | butanol | 0.13% |
| Comparative resin F for comparison H | 60% | butanol | ethanol/butanol | 0.37% |

TABLE 2

| | Test results | | | |
|---|---|---|---|---|
| Test | Example 7 | Comparison F | Comparison G | Comparison H |
| Konig pendulum hardness [sec.] | | | | |
| after 3 hours | 48 | 37 | 26 | 46 |
| after 5 hours | 71 | 65 | 55 | 68 |
| after 7 hours | 91 | 82 | 68 | 87 |
| after 24 hours | 156 | 154 | 144 | 154 |
| after 48 hours | 182 | 175 | 175 | 168 |
| Pot life [days] | 18 | 12 | 10 | 12 |
| Formaldehyde emission [mg/g of dry film] during the period | Example 8 | | | |
| 0–0.5 hour | 1.0 | 2.8 | 4.0 | 5.5 |
| 0.5–1.0 hour | 0.3 | 1.7 | 3.5 | 2.0 |
| 1.0–4.0 hours | 0.7 | 3.3 | 6.2 | 2.5 |
| 4.0–24.0 hours | 1.2 | 4.7 | 7.3 | 4.7 |
| Σ0–24.0 hours | 3.2 | 12.5 | 21.0 | 15.7 |

We claim:

1. A process for the preparation of a curable etherified aminoplast resin based on a urea/aldehyde polycondensate, wherein urea is first reacted with an α,α-dialkylaldehyde of the general formula

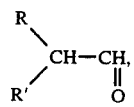

where R and R' are identical or different and are each alkyl of 1 to 6 carbon atoms, in a molar ratio (urea/aldehyde) of about 1:2, where as much as 50 mol % of the α,α-dialkylaldehyde may be replaced with formaldehyde, at from 50° to 120° C., under atmospheric or superatmospheric pressure, in the presence of an acid and in the presence or absence of one or more alcohols and/or other organic solvents, and the 2-oxohexahydropyrimidine derivative obtained in this cyclocondensation is then condensed with formaldehyde in the presence of one or more alcohols and of an acid and in the presence or absence of an inert diluent.

2. The process of claim 1, wherein the cyclocondensation product is first hydroxymethylated, and then condensed with an alcohol in an acidic medium.

3. The process of claim 1, wherein the hydroxymethylation and condensation of the 2-oxohexahydropyrimidine derivative are carried out simultaneously at a pH of from 3 to 6.

4. An acid-curable or heat-curable surface coating resin which comprises: a surface coating binder and a curable etherified aminoplast resin prepared by the process of claim 1.

5. A curable etherified aminoplast resin prepared by the process of claim 1.

6. A curable etherified aminoplast resin prepared by the process of claim 2.

7. A curable etherified aminoplast resin prepared by the process of claim 3.

* * * * *